United States Patent [19]
Scaringe et al.

[11] Patent Number: 5,582,020
[45] Date of Patent: Dec. 10, 1996

[54] CHEMICAL/MECHANICAL SYSTEM AND METHOD USING TWO-PHASE/TWO-COMPONENT COMPRESSION HEAT PUMP

[75] Inventors: Robert P. Scaringe; Fulin Gui, both of Rockledge; Lawrence R. Grzyll, Merritt Island, all of Fla.; Steve M. Benner, Columbia, Md.

[73] Assignee: Mainstream Engineering Corporation, Rockledge, Fla.

[21] Appl. No.: 347,095

[22] Filed: Nov. 23, 1994

[51] Int. Cl.$^6$ ................................................... F25B 15/00
[52] U.S. Cl. ............................... 62/102; 62/476; 418/76
[58] Field of Search ........................... 62/101, 102, 112, 62/114, 476; 418/76

[56] References Cited

U.S. PATENT DOCUMENTS

| | | | |
|---|---|---|---|
| 2,307,380 | 1/1943 | Baker | 62/101 |
| 2,938,362 | 5/1960 | Schwind | 62/102 |
| 4,018,583 | 4/1977 | Patnode et al. | 62/101 |
| 4,420,946 | 12/1983 | Rojey et al. | 62/101 |
| 4,724,679 | 2/1988 | Radermacher | 62/101 |
| 4,966,007 | 10/1990 | Osborne | 62/101 |
| 4,967,566 | 11/1990 | Bergmann et al. | 62/101 |

*Primary Examiner*—William Doerrler
*Attorney, Agent, or Firm*—Evenson, McKeown, Edwards & Lenahan P.L.L.C.

[57] ABSTRACT

A heat pump system and method utilizes heat of mixing, in addition to the latent heat of solution, to increase cooling ability and thermal performance. The system includes a unique two-phase compressor for compressing a two-component mixture of liquid absorbent-refrigerant solution and superheated vapor to a high pressure. A generator extracts heat from the volume to be cooled by desorption and evaporation of the refrigerant from the high concentration solution in fluid connection with the inlet of the compressor. An absorber releases heat to surroundings by absorbing and condensing refrigerant vapor back into the liquid solution. A throttle valve controls the flow and reduces the pressure of the working fluid is in fluid connection with the absorber and the generator.

16 Claims, 12 Drawing Sheets

5,582,020

CHEMICAL/MECHANICAL SYSTEM AND METHOD USING TWO-PHASE/TWO-COMPONENT COMPRESSION HEAT PUMP

BACKGROUND AND SUMMARY OF THE INVENTION

The present invention relates to an improved vapor-compression heat pump system and method and, more particularly, to a vapor-compression heat pump with a two-phase/two-component solution which is compressed by a novel liquid-vapor compressor to provide a lightweight, efficient and reliable thermal control system.

A conventional heat pump system uses the basic vapor compression cycle schematically shown in FIG. 1 in which a refrigerant evaporates at low pressure to provide the desired cooling. The refrigerant vapor is then slightly superheated in the evaporator to avoid knocking associated with liquid compression. Thereafter, the superheated refrigerant vapor is compressed to a higher pressure to raise the condensation temperature so that heat can be transferred to another environment as the compressed superheated refrigerant vapor condenses into a subcooled liquid. This liquid is throttled in an expansion device to a two-phase mixture which then enters the evaporator to complete the process. FIG. 1A shows a modification of the basic vapor compression cycle with a heat recovery heat exchanger to improve the performance.

Also known is a heat pump system using a similar cycle commonly referred to as a vapor-compression cycle with solution circuit. FIG. 2 schematically shows this cycle, and FIG. 2A further shows that cycle but with a heat recovery heat exchanger to improve the performance in a manner similar to FIG. 1A.

For purposes of the following description of the solution circuit cycle, the "absorbent" is defined as a liquid capable of absorbing a refrigerant in vapor state to form a liquid solution. "Solution" is defined as the absorbent with a certain percentage of refrigerant in solution. The "mixture" is defined, unless otherwise indicated, as a two-phase, two-component liquid-vapor mixture consisting of liquid absorbent and refrigerant solution mixed with superheated refrigerant vapor. "Solution concentration" refers to the relative amounts of absorbent and refrigerant, and is based on the absorbent concentration. A weak solution contains more refrigerant in solution than does a strong solution. Pure absorbent would be the strongest possible solution, whereas pure refrigerant would be the weakest possible solution.

In this vapor-compression heat pump with solution circuit cycle, a generator is used in lieu of the pure-refrigerant, or single-component refrigerant, evaporator, and a single-phase, two-component weaker solution (e.g. an all liquid solution with absorbed refrigerant) enters the generator with resulting generation and dispersion of some or all of refrigerant vapor from the solution mixture to provide the cooling of, for example, a space. Because refrigerant is driven off the solution, the concentration of absorbent is increased which results in a stronger solution. The liquid and vapor are physically separated in this cycle, and both the heat of vaporization of the refrigerant and the heat of dissolution (the reverse of the heat of solution) are absorbed in the generator which is a combination of a heat exchanger and a liquid separator. The superheated vapor which is driven off and separated is compressed to higher pressure, and the remaining stronger liquid solution (i.e., the absorbent-and- refrigerant liquid solution) is compressed using a liquid pump.

The separate liquid and vapor streams at the higher pressure in the conventional solution circuit cycle are then combined in the absorber, where the absorption of the refrigerant vapor into the solution, causes heat to be transferred to the environment via heat of condensation plus heat of solution. The absorber is thus both a heat exchanger for transferring, or rejecting, heat to the environment as well as a device for exposing the concentrated liquid solution to the vapor. One type of known absorber utilizes a falling film of liquid solution which passes through the vapor as the liquid solution falls. The mixture accumulates at the bottom of the falling film where a heat-transfer coil or pipe transfers the heat out of the solution and into a pumped coolant flowing through this cooling coil.

After leaving the absorber shown in the embodiment of FIG. 2, or in the alternative embodiment of FIG. 2A using the heat recovery heat exchanger, the pressure of the resulting liquid two-component mixture is then decreased, via a throttling valve, and the mixture reenters the generator to complete the cycle. The vapor-compression cycle with solution circuit has an improved $COP_c$ (Coefficient of Performance) because the latent heat has increased, thereby increasing the cooling capacity, for very little additional work. The system is not very practical, however, because it requires constant balance of the liquid solution flow and compressed vapor flows which combine in the absorber. Unfortunately, the flow rates of the vapor and the liquid solution change with cooling temperature and load, and the liquid pump and vapor compressor typically have different flow-versus-pressure characteristics. The end result is that even under typical variable loads, the vapor compressor and liquid pump discharge pressures do not always match causing significantly reduced performance or even temporary failure of the system. Complex pump, compressor, and/or by-pass control logic have not effectively resolved this very volatile control problem, and these control methods reduce performance and significantly increase complexity.

Another significant shortcoming of this vapor-compression cycle with solution circuit is that the absorber must expose the vapor to the liquid solution, via a falling film or some other mechanical apparatus, adequately to mix the vapor. Because of the finite time required for the chemical or physical absorption to occur, there must be sufficient residence time to allow the refrigerant to absorb into the bulk liquid mixture. This residence time requires a significant amount of space which means that absorbers are disadvantageously quite large, a serious disadvantage in applications where space and weight are critical. Similarly, generators must provide sufficient time and free surface to allow the desorbed vapor to physically migrate out of the solution; again, this requires a significant amount of space. Generators, which are not quite as large as absorbers, are the second largest component in the system. Large size also usually means heavier and more expensive, disadvantages which are severe where space, weight and cost are important considerations.

It is an object of the present invention to overcome the disadvantages of the known vapor-compression heat pump with solution circuit while retaining the advantages of that system. This object has been achieved by a system which compresses the two-phase, two-component solution together without separating them. That is, the liquid refrigerant/absorbent solution and the superheated vapor are compressed together as a mixture rather than using a separate compressor and pump. As a result, it is not required that the low temperature generator-like heat exchanger also be a separator, and the high-pressure, heat rejection absorber-like heat exchanger does not need to distribute the vapor to the solution, since they always remain in contact, i.e. always remain well mixed. In fact, both of these heat exchangers can be shell-and-tube-heat exchangers or any other type of compact heat exchanger in lieu of a larger falling-film type absorber or generator. Furthermore, the disadvantage of a finite absorption/desorption time which leads to large absorbers and generators in adsorption heat pumps and vapor-compression heat pumps with solution circuits is an advantage in the chemical/mechanical heat pump of the present invention.

The major basic components of the chemical/mechanical heat pump system of the present invention comprise an absorbent/refrigerant working fluid mixture of two miscible fluids which, when effected by heat addition, form a pure vapor fluid and a remaining liquid fluid; a low temperature heat exchanger which allows for the desorption and vaporization or chemical reaction of refrigerant from the liquid mixture to form a liquid-vapor mixture; a two-phase compressor which compresses this liquid-vapor mixture; a high temperature heat exchanger which allows the compressed mixture to reject heat as the vapor is recombined with the liquid solution; and a throttling valve which drops the liquid solution pressure (ideally constant enthalpy), so that the working fluid can once again be desorbed and vaporized or chemically reacted in the low temperature heat exchanger.

The working fluid for the cycle of the present invention is an absorbent/refrigerant mixture. For the purposes of the following description of the cycle of the present invention, the absorbent can be a liquid capable of absorbing refrigerant vapor to form a liquid solution, a solid particle absorbent or adsorbent suspended in a liquid carrier capable of absorbing or adsorbing refrigerant vapor, or a liquid compound capable of reversible chemical reaction with refrigerant vapor to form a new liquid-phase compound. In connection with the foregoing, absorption refers to the penetration of one substance into the inner structure of another, adsorption refers to the adherence of molecules to the surface of another substance, and chemical reaction refers to the chemical change of the molecule.

The refrigerant of the absorbent/refrigerant mixture can be a compound in the vapor phase. The absorption, adsorption, or reaction of refrigerant vapor into solution rejects a heat of mixing (heat of absorption, heat of adsorption, heat of solution, or heat of reaction) and heat of vaporization during the mixing process. Reversing the process, namely the liberation of the refrigerant from the liquid solution, requires the addition of the heat of mixing and the heat of vaporation to cause this vaporization of the refrigerant vapor from the liquid solution (i.e., the refrigerant is driven from the solution as a superheated vapor).

The working fluid mixture has greater latent heat capability, when compared to a pure or single-component working fluid, because a pure fluid (or refrigerant) has only latent heat of vaporization, whereas the absorbent-refrigerant mixture of the present invention utilizes the heat of vaporization and the heat of mixing (i.e. heat of absorption, heat of adsorption, heat of solution, or heat of reaction), which can be much greater than the latent heat of vaporization alone.

According to the present invention, a substantially liquid solution (i.e. liquid absorbent, solid absorbent/adsorbent in a liquid carrier or a liquid compound with the capability of reversible chemical reaction) with absorbed/adsorbed or chemically-reacted refrigerant, leaves the high temperature heat exchanger after rejecting heat to the surroundings, and enters the throttling or expansion valve where the pressure is decreased. The solution then enters the low temperature heat exchanger where the heat is transferred into the solution (which provides the desired cooling) and drives some of the refrigerant out of solution. This solution is typically now a superheated refrigerant vapor and liquid solution mixture which is not separated, but instead is kept together and compressed to a desired higher pressure. As the mixture of absorbent and refrigerant is compressed, the refrigerant vapor will begin to recombine with the absorbent in the compressor. This process is, however, substantially adiabatic (insulated) because the small residence time and heat transfer area of the compressor limits the heat transfer. Consequently, the discharge temperature of the compressor is increased more than that of a conventional vapor-only compression system. When the compressed absorbent/refrigerant mixture reaches the high temperature heat exchanger, the heat is rejected to the surroundings. As the solution cools, additional vapor is condensed and recombines (i.e. absorbs, adsorbs or reacts) with the liquid solution. The fluid thereafter leaves the high temperature heat exchanger as a liquid absorbent solution which is then throttled before returning to the low temperature heat exchanger.

There are rather significant advantages of the chemical/mechanical heat pump of the present invention over the conventional vapor compression cycle with solution circuit. In the typical vapor compression cycle with solution circuit, the heat adsorbed in the generator at low temperature causes the vaporization and desorption of the refrigerant from the liquid solution and the two fluids are then physically separated. The refrigerant vapor is compressed and the liquid solution is pumped to higher pressures where they are combined. Unfortunately while this cycle has the potential for higher performance, the complexity of the separation process combined with the complexity with matching the compressor and pump discharge pressures under continually varying flow ratios makes this system of limited practical application. In the present invention, a compact heat exchanger, instead of an absorber, can be used to transfer the energy necessary to liberate the vapor from the solution; however the liquid solution and superheated vapor (which has been driven from the solution by the addition of heat) are not separated. At the conditions in this heat exchanger, there is an equilibrium concentration of the superheated vapor with the solution. As the mixture of liquid solution and entrained superheated vapor is compressed, however, the vapor will no longer be in equilibrium concentration with the solution and instead will begin to recombine with the absorbent solution which results in the rejection of energy, from the heat of mixing and heat of vaporization.

The absorption of the vapor back into the liquid in the system of the present invention begins to occur as soon as the mixture is compressed and is quite different from the vapor compression cycle with solution circuit where the solution and vapor streams have been physically separated, so they can be pressurized (vapor compressed and liquid pumped) and recombined in the absorber. In the conventional vapor-compression cycle with solution circuit, the absorber must physically mix these components and provide the necessary residence time for this recombination to take place so that heat energy of mixing and vaporization can be rejected in the absorber's heat exchanger. In the chemical/mechanical cycle of the present invention, however, the solution and vapor are always well mixed and the recombination begins as soon as the fluids begin to be compressed.

We have found it to be essential that the absorbent/ refrigerant mixture must be compressed and rejected from the compressor before significant absorption can take place. Ideally, the compression is instantaneous so that no vapor has time to get back into solution. Conversely, if the compression were very slow, all the vapor would have a chance to get back into solution, and the performance would be severely reduced. The compression can be accomplished quite rapidly, resulting in essentially very little recombination of vapor and solution in the compressor.

A significant benefit of our approach is that a liquid vapor separator is not used, a large adsorber (large because of the need to get the vapor in contact with the solution) is not used, and a larger generator (larger because of the need to allow the solution time to desorb the vapor from solution) is not used. In other words, in an unfortunate thermodynamic characteristic, namely the finite time necessary to absorb or desorb the vapor into or out of the solution, had traditionally resulted in large absorbers and generators. However, in the chemical/mechanical heat pump configuration, this same recombination time requirement is eliminated, resulting in a smaller overall system, with far fewer components.

In order to achieve the foregoing advantages with the cycle of the present invention, the liquid-vapor mixture must be compressed without knocking. Conventional compressors compress only a vapor, however, and, in fact, the inlet vapor to a compressor is usually superheated to avoid any knocking caused by the attempt to compress a liquid. We have been able to achieve in a liquid absorbent and vapor refrigerant system two phase compression without knocking by the use of a sliding vane compressor of the type generally described in U.S. Pat. No. 5,310,326; the disclosure of which is incorporated herein by reference.

Alternatively, a solid particle absorbent or adsorbent in a liquid carrier (such as metal hydride absorbent and hydrogen refrigerant) can be used in which the solid absorbent is only 20% of the liquid mixture and only 5% of the hydrogen refrigerant is adsorbed on the absorbent (therefore 1.0% of the solution is vapor by mass, but 13% of the solution is liquid by volume). Although a two-phase compressor is still required, the effective latent heat is 63.0 BTU per pound of hydride-carrier-hydrogen mixture (which is comparable to the latent heat of refrigerant-22 at 87 BTU/lb. or refrigerant-12 at 64 BTU/lb.) but the pressure ratio is only 1.7 for the hydride slurry as compared to 4.3 for refrigerant-12 or 4.2 for refrigerant-22. The lower pressure ratio results in reduced compressor work for the same mass flow rate. Therefore, the metal hydride absorbent example demonstrates significantly improved performance because the lower pressure ratio results in reduced work for essentially the same cooling capacity per unit mass flow of working fluid.

Since the coefficient of cooling performance, $COP_c$, is defined as the cooling capacity divided by the work, the substantial increase due to the heat of mixing of the working fluid in the present invention increases the cooling capacity significantly. Because liquids are relatively incompressible, the additional work to compress the liquid solution over the larger pressure ratio is reduced. Alternatively, for the embodiment using solid absorbent/adsorbent materials in a liquid carrier (such as metal hydrides), the latent heat is not significantly improved compared with pure refrigerant, but the compressor work is significantly reduced because of the significantly lower pressure ratio. Therefore, for both types of working fluid mixtures, the $COP_c$ increases significantly compared with a conventional single fluid vapor-compression system.

We have also discovered several characteristics that make for an ideal absorbent/refrigerant mixture (or pair) to effect the objectives and advantages of the present invention. For instance, the absorbent liquid must be relatively non-volatile at the generator temperature and have a high affinity for the refrigerant vapor. Both the absorbent and refrigerant must be condensable in the operating temperature range and must not have an excessive vapor pressure. Both fluids should be inert at system temperatures. The fluids should have a high density and a high heat of solution. The fluid must also be compatible with all material it will encounter in the heat pump system and be environmentally safe and non-ozone depleting.

The innovative heat pump system according to the present invention is a substantially improved vapor-compression refrigeration/heat pump using the heat of mixing (i.e., heat of absorption/adsorption, heat of solution or heat of reaction) to enhance the thermal performance, thereby reducing space requirements, component weight and cost. In addition to the latent heat of vaporization alone, the heat of mixing, is advantageously used to increase the cooling capacity and performance.

A component of the improved heat pump system of the present invention is a two-phase, positive displacement compressor for compressing the mixture of the liquid absorbent-refrigerant solution and vapor to a high pressure. The compressor has a composite bore composed of cycloidal and circular curves based upon a recognition of fluid compression and vane motion dynamics, which is compact and lightweight, for two-phase flow and determined based upon calculations of radial components of vane velocity and acceleration, and sealing required between the rotor and bore. With appropriate transitions between the circular and cycloidal curves, dynamic forces are reduced to a minimum. A rotor is located eccentrically inside the bore and has four symmetric vane slots connected each at the bottom. Four self-lubricating vanes slide in the slots following the bore contour as the rotor rotates in a manner generally described in U.S. Pat. No. 5,310,326, resulting in variable volume chambers needed for drawing-in and compressing the two-phase/two-component mixture. A circumferential inlet streamlines the inlet flow and reduces the fluid impact on the bore. A circular sealing area on the bore advantageously helps to seal the fluids effectively, and the cycloidal curves provide vanes with a smooth movement. Compression has been successfully carried out for a two phase mixture with a 30% (by weight) liquid solution at a pressure ratio of approximately 4. Compression of higher weight percent liquid concentrations is possible at lower pressure ratios as is the case, for example, with metal hydrides in a liquid carrier.

To achieve the chemical/mechanical heat pump, the liquid solution, mixed with refrigerant vapor, is driven to the high pressure side by the two-phase compressor of the present invention. Prior to the present invention, compressors could not successfully, i.e. without damage, compress a two phase mixture to high pressure. In fact, conventional compressors were typically safeguarded from two phase compression because it reduced compressor life due to fluid impact and/or compressor knocking. For two-phase flow system in thermal, chemical, and petroleum industries, the traditional way to handle two phase compression was to separate the fluid from the mixture, then use an additional pump to drive the liquid while a compressor pressurized gas or vapor. This former method often led to difficulties in process control such as matching the dynamic characteristics of the pump and the compressor, or accommodating different flow ratios of pump and compressor. In addition, the known compressors did not address the problem of knocking. Positive displacement compressors were more susceptible to fluid knocking problems which caused damage from enormous pressure during operation. The compressor configuration of the present invention effectively avoids these problems.

BRIEF DESCRIPTION OF THE DRAWINGS

These and other objects, features and advantages of the present invention will become more apparent from the following detailed description thereof when read, without being limited to specific details, in conjunction with the appended drawings wherein.

DETAILED DESCRIPTION OF THE DRAWINGS

Figure 1:
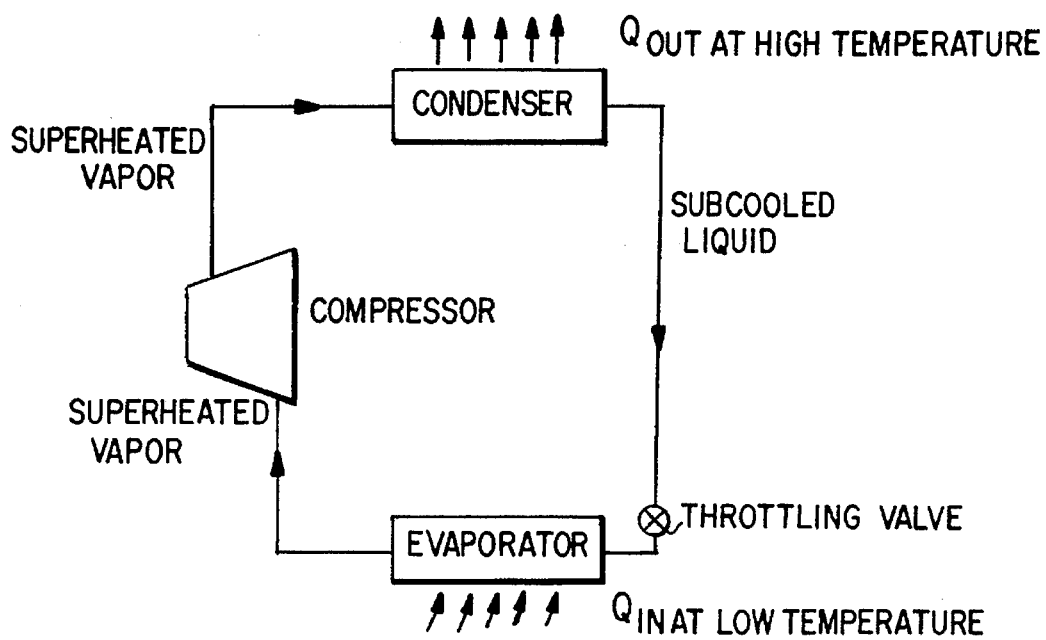
FIGS. 1 and 1A are schematic representations of conventional heat pump systems using a basic vapor-compression cycle as discussed above.
Figure 1A:
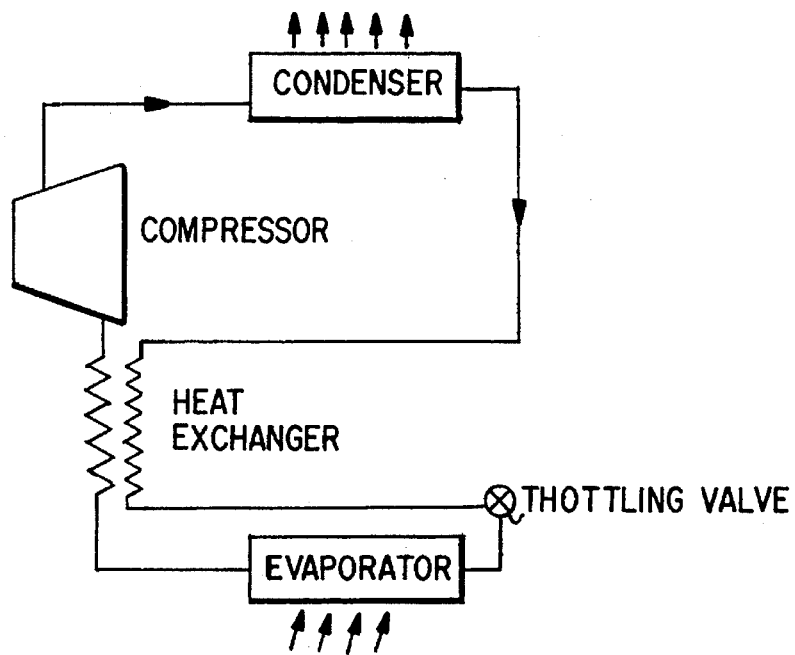
Figure 2:
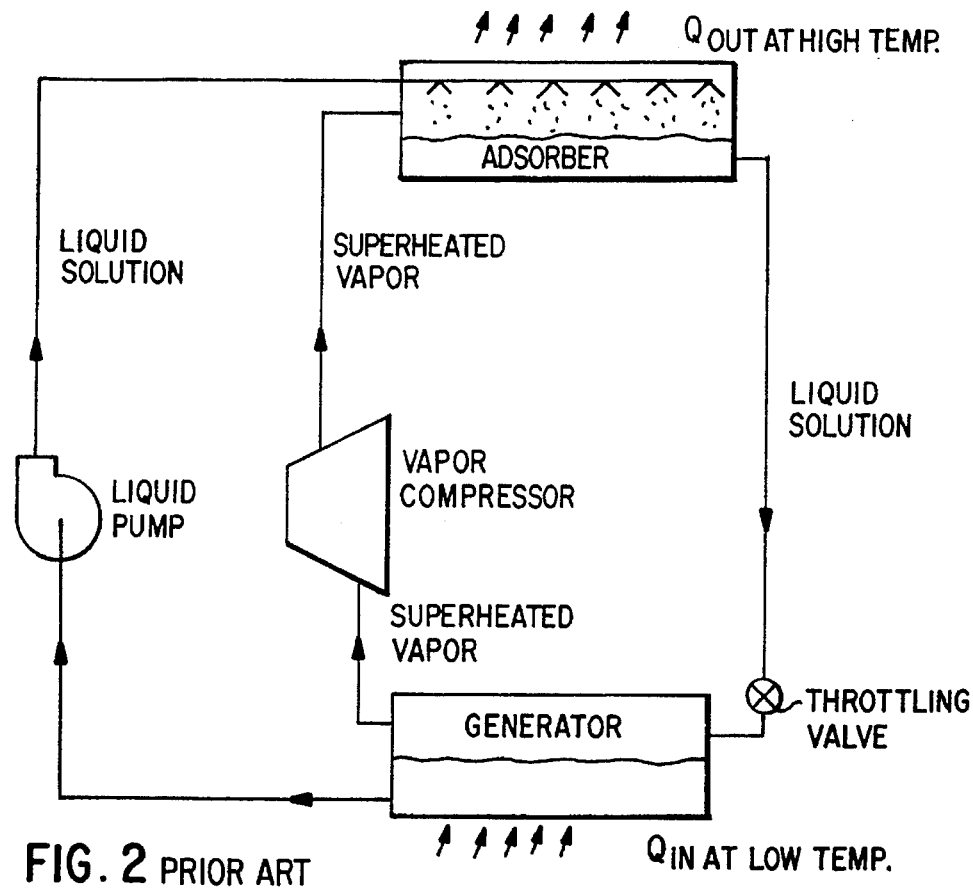
FIGS. 2 and 2A are schematic representations of conventional heat pump systems using a vapor compression cycle with solution circuit as discussed above.
Figure 2A:
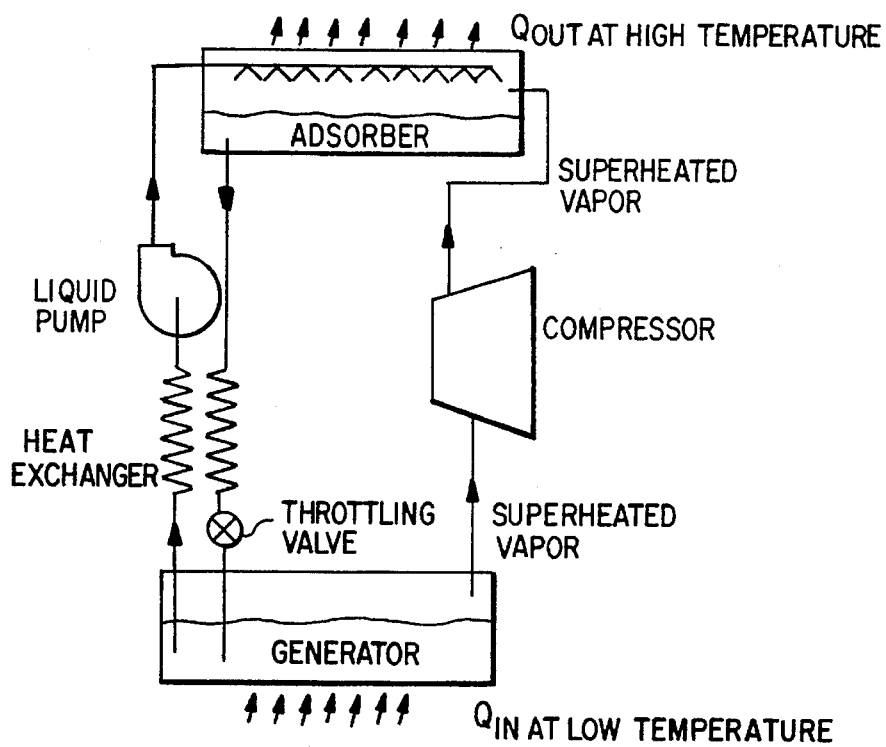
Figure 3:
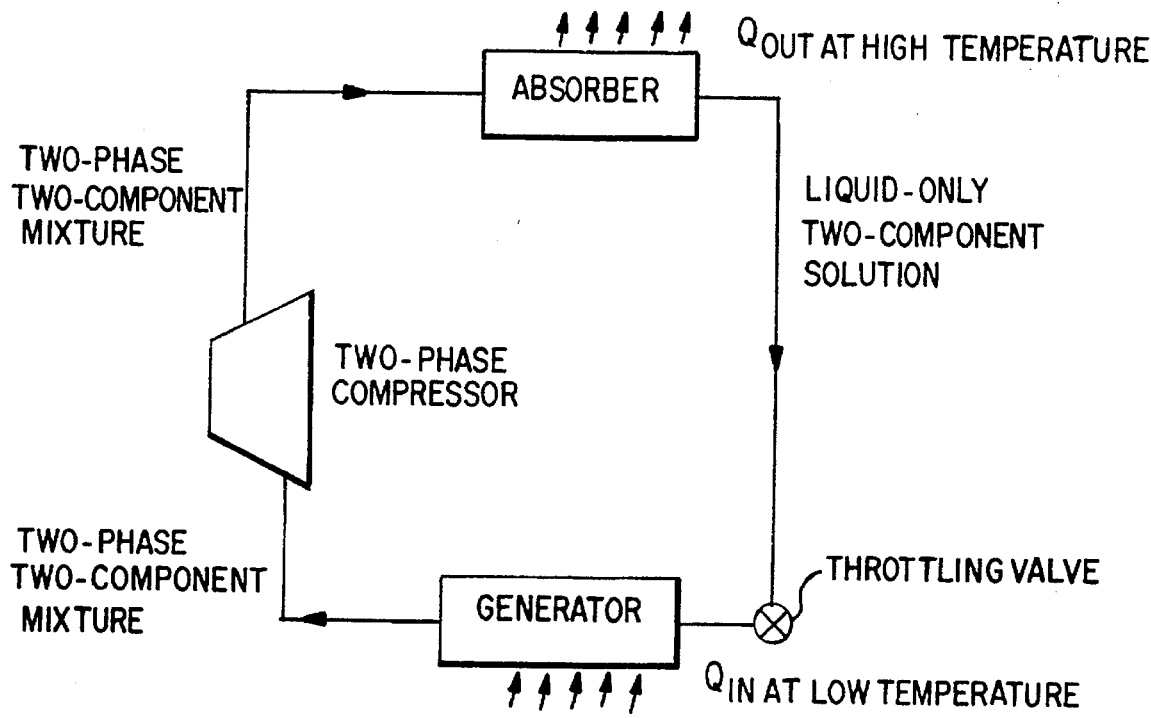
FIGS. 3 and 3A are schematic representations of heat pump systems in accordance with the present invention.
Figure 3A:
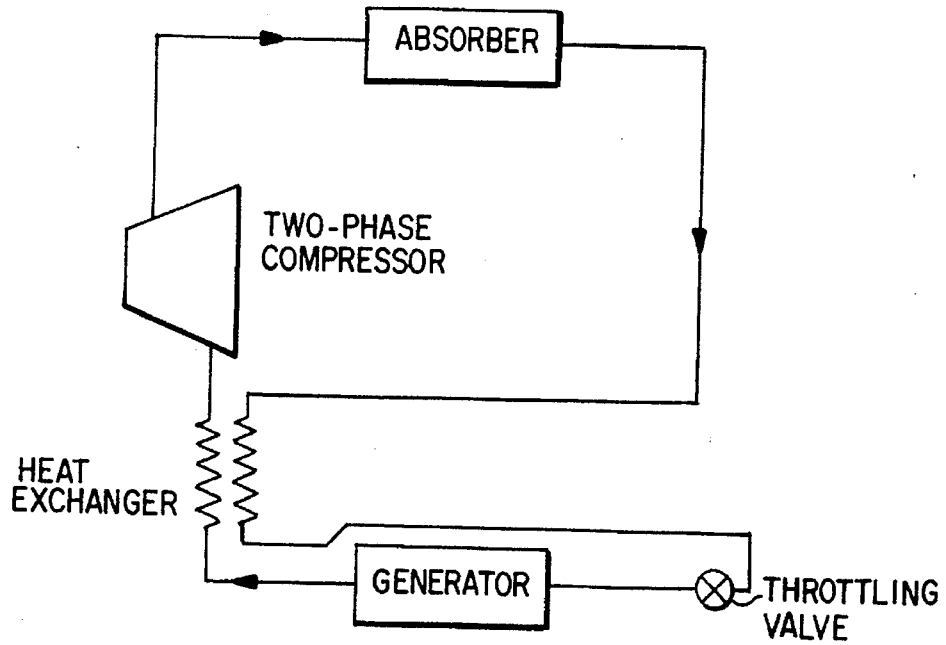

Referring now to FIG. 3, it can be seen that, generally speaking, the components of the heat pump system of the present invention are similar to the systems shown in FIGS. 1 and 2 in the sense of having two heat exchangers, a throttling valve and a compressor. The low temperature heat exchanger of the present invention is, however, compact and allows for the desorption and vaporization of refrigerant from the liquid solution. The compressor of the present invention is a two-phase compressor which is described in detail below and which compresses the liquid and vapor mixture without knocking. The high temperature heat exchanger of the present invention is also compact and allows the compressed mixture to cool so that vapor can recombine with the liquid solution. A throttling valve of conventional construction decreases the liquid solution pressure (ideally constant enthalpy), so that the working fluid can once again be desorbed and vaporized in the low temperature heat exchanger. When compared to a pure working fluid (refrigerant) which has only latent heat of vaporization, the absorbent-refrigerant fluid of the present invention has greater latent heat capability due to the heat of vaporization and the heat of mixing which can be considerably more than the latent heat of vaporization alone.

The above-noted increase in latent heat also increases the cooling capacity significantly. Because liquids are relatively incompressible, the additional work to compress the liquid solution, and to account for the larger pressure ratio is reduced. Consequently, the $COP_c$ increases significantly.

Figure 4:
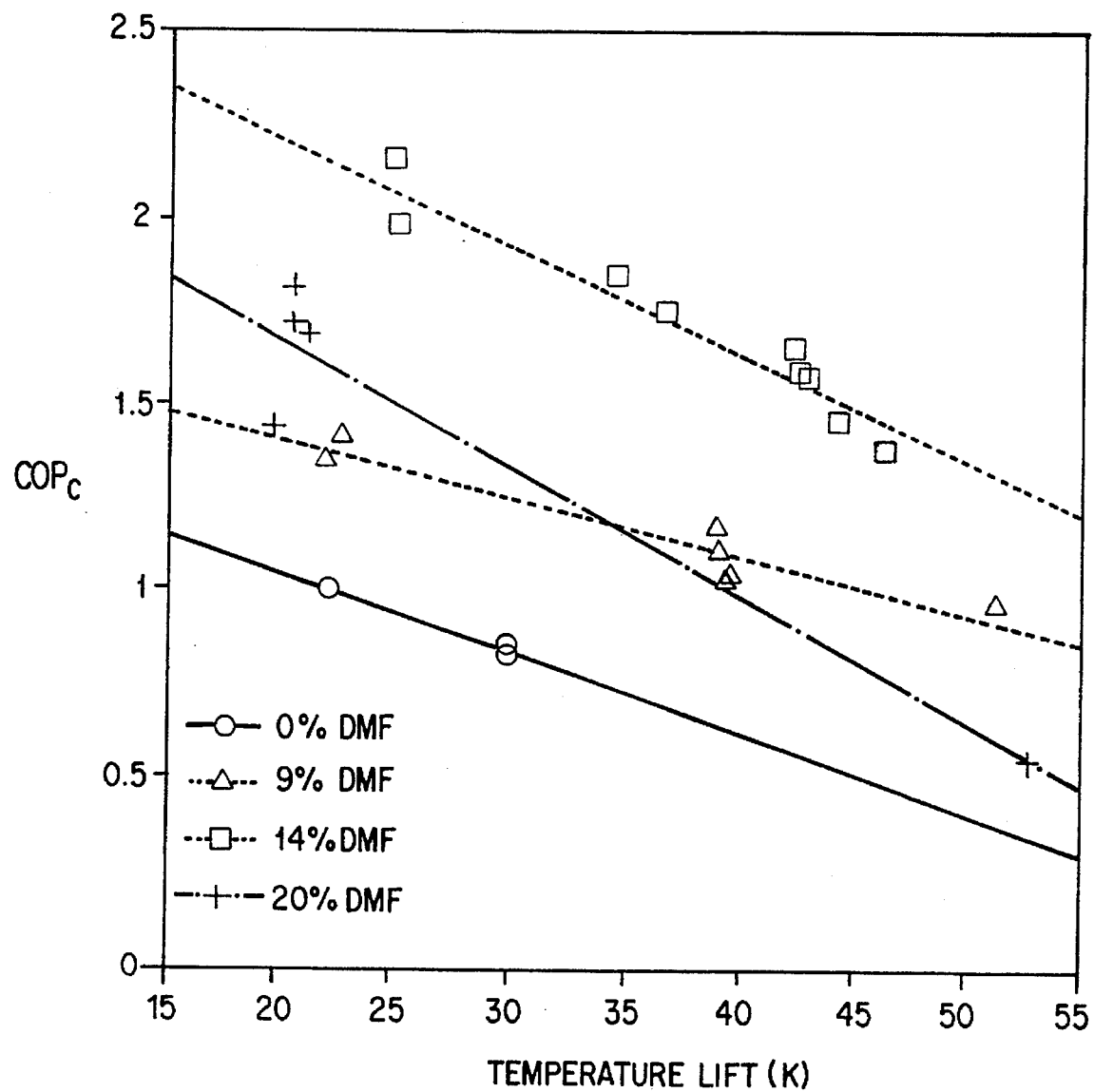
FIG. 4 is a graph showing the relationship between the coefficient of cooling performance and average temperature "lift" for various solution concentrations.

FIG. 4 is a graph of the coefficient of performance in cooling ($COP_c$) versus average temperature lift for various solution concentrations from 0% absorbent to 20% absorbent which is typical in a vapor compression cycle using R-22 as the refrigerant and N,N-dimethylformamide (DMF) as the absorbent. Numerous other possible absorbents and refrigerants are, however, within the scope of the present invention. The performance data in FIG. 4 exemplifies the benefit of using the liquid solution and also demonstrates that there is an optimum concentration of liquid solution. For example, increasing the solution concentration from 0% to 14% absorbent increases the $COP_c$, but the performance is reduced at solution concentrations above 14%.

Table 1 list several other contemplated classes of absorbent-refrigerant mixtures (or pairs) including pairs that are environmentally safe, non-toxic, and non-ozone depleting.

TABLE 1

| Potential Refrigerant-Adsorbent Pairs | |
|---|---|
| Refrigerant | Absorbent |
| water | aqueous lithium bromide solution |
| | aqueous sodium hydroxide solution |
| | aqueous magnesium chloride solution |
| | aqueous sulfuric acid solution |
| | aqueous potassium hydroxide solution |
| | aqueous calcium chloride solution |
| ammonia | lithium nitrate/ammonia solution |
| | ammonium chloride/ammonia solution |
| | sodium thiocyanate/ammonia solution |
| | ammonium bromide/ammonia solution |
| | ammonium thiocyanate/ammonia solution |
| | ammonium iodide/ammonia solution |
| | lithium thiocyanate solution |
| methanol | lithium bromide/methanol solution |
| | zinc bromide/methanol solution |
| | calcium bromide/methanol solution |
| methylamine | lithium thiocyanate/ methylamine soln. |
| halogenated hydrocarbons (CFCs, HCFCs, HFCs) | tetraethylene glycol dimethylether |
| | N,N-dimethylformamide |
| | N,N-dimethylacetamide |
| | dibutyl sebacate |
| | dibutyl phthalate |
| | diethylene glycol |
| | aniline |
| | xylene |
| | dimethylether diethylene glycol |
| sulfur dioxide | tetraethylene glycol dimethylether |
| | N,N-dimethylformamide |
| | N,N-dimethylacetamide |
| | dibutyl sebacate |
| | dibutyl phthalate |
| | diethylene glycol |
| | aniline |
| | xylene |
| | dimethylether diethylene glycol |

TABLE 1-continued

Potential Refrigerant-Adsorbent Pairs

| Refrigerant | Absorbent |
|---|---|
| hydrogen | metal hydrides in a liquid carrier (e.g. water, toluene, or n-undecane) |
| hydrogen | cyclohexane <-> benzene + hydrogen |

Several characteristics define an ideal absorbent/refrigerant pair: (1) the absorbent liquid, solid absorbent, solid adsorbent or chemical reacting liquid must be relatively non-volatile at the generator temperature and have a high affinity (or high reactivity in the case of reacting liquid) for the refrigerant vapor; (2) both the absorbent and refrigerant must be condensable in the operating temperature range and must not have an excessive vapor pressure; (3) both fluids should be inert at system temperatures; (4) the fluids should have a high density and a high heat of solution; and (5) the fluid must also be compatible with all material it will encounter in the heat pump system, and be environmentally safe and non-ozone depleting.

As previously noted, the heat pump system of the present invention is an improved vapor-compression refrigeration/heat pump using the heat of solution to enhance the thermal performance. In addition to the evaporating latent heat, the present invention makes practicable the use of the latent heat of mixing (i.e., heat of absorption, heat of adsorption, heat of reaction or heat of solution) to increase the cooling ability and performance. The use of the heat of mixing has been made possible by a unique two-phase compressor to compress the liquid absorbent-refrigerant solution and vapor mixture to a high pressure without experiencing damaging knocking.

Figure 5:
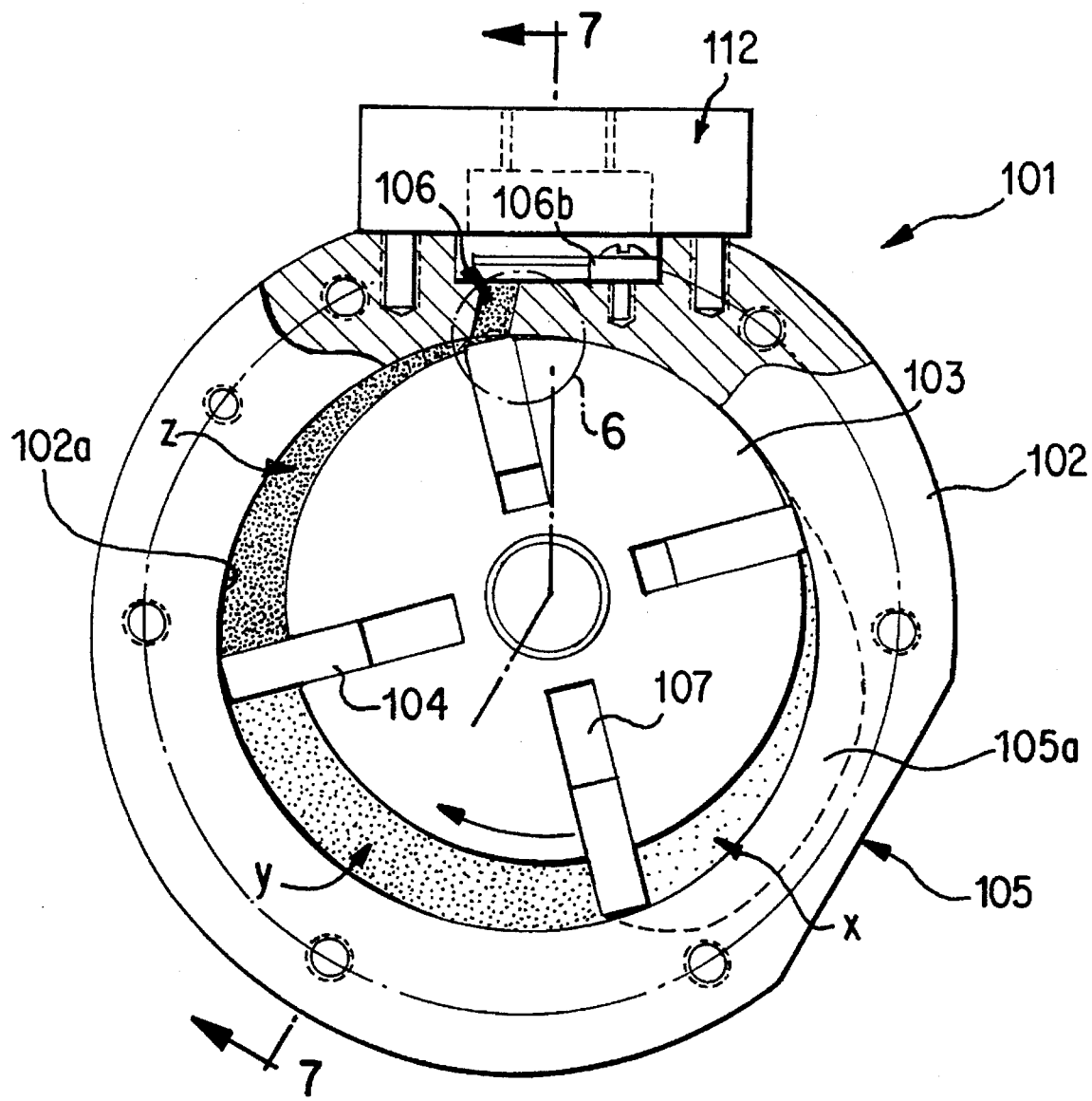
FIG. 5 is a schematic elevation view, partially in cross section, of the two-stage compressor used in the systems of FIGS. 3 and 3A, with the end cap and end disk of the compressor removed.

Referring now to FIG. 5, the compressor designated generally by numeral 101 consist of three basic components, namely a bore housing 102, a rotor 103, and four vanes 104. When the rotor 103 rotates, the vanes 104 constantly maintain contact with the bore housing 102 due to centrifugal force and form variable chambers x, y and z. The solution and refrigerant mixture enters the compressor 101 through a circumferential inlet 105. When the rotor 103 rotates clockwise as viewed in FIG. 5, the mixture is driven from the expanding chamber x to transient chamber y and is slightly compressed. Finally, the rotor 103 drives the mixture to the compression chamber z where the mixture is fully compressed and quickly driven out of the compressor 101 through a radial port 106 and discharge valve assembly 106b. Vanes 104 travel in vane slots 107. Vane slots which are 180° opposite each other are connected by respective, non-intersecting pressure equalizing passages 108a, 108b.

The bore contour 102a essentially controls the sliding movements of the vanes in combination with the aforementioned centrifugal force on the vanes 104 and comprises segments of three different curves determined in accordance with a copyrighted Fortran program owned by applicants' assignee, Mainstream Engineering Corporation of Rockledge, Fla. and as represented by the following source code in which bore profile circumference or center path are in the cartesian coordinate system and in which:

```
C This program is to determine the profile of a bore based on cycloid curves
C which will have continuous acceleration curves.
C  This program was revised from previous program based on modified ellips.
C               1992-11-4
C
C  T0 : theta
C1 T0A-T0B: circle about 20 degree, or Pi/8
C2 T0B-T0C: cycloidal curve, +a, about 66.67 degree, or Pi/4
C3 T0C-T0E: straight line, a=0, about 66.67 degree, or Pi/4
C4 T0E-T0F: cycloidal curve, -a, about 66.67 degree, or Pi/4
C5 T0F-T0G: circle about 20 degree, or Pi/8
C
C  T0A-T0G: Pi, 180 degree
C  T0G-T0A: this part curve is symmetric to the y axis.
C
C  1. to calculate the coordinates of the compressor bore
C This bore profile consists of eight pieces, two pieces of circle arcs,
C four pieces of cycloidal arcs, and two piece linear increasing arc
C between two cycloidal arcs.
C
C  2. to calculate the velocity and accelation of the vane.
C
C   R0 - rotor radius
C   Ls - stretch length of vanes
C   Lso- ¼ stretch length of vanes
C   T0A - the angle at which center of seal arc is located
C   T0B - the angle at which the first cycloidal arc begins
C   T0C, T0E, T0F: conjunction points of different curves and arcs.
C   r - radius variable (inch)
C   x,y - point coordinates
C C   program compbore1992-11
    program compbore
    common Theta(2100), r(2100)
C   doubleprecision Theta,r
    parameter(Pi=3.141593, T0a=0., T0g=3.141593)
    real Ls,lso
    open(10,file='input.bor',status='old')
    open(20,file='bore.dat',status='unknown')
```

```
    open(30,file='Cycldbor.mill',status='unknown')
c initial data setup
    write(*,*)'Read the the data from data file: INPUT.BOR'
    read(10,*) Ro, Ls, Npoints, D0circle
    D0=(180.-2*D0circle)/3.0 *Pi/180.
    D0straight=D0
    D0cycloid =D0
    Lso=Ls/4.0
    T0b=T0a+D0circle *Pi/180.
    T0c=T0b+D0cycloid
    T0e=T0c+D0straight
    T0f=T0e+D0cycloid
    Write(*,*)'T0a,b,c,e,f,g=',T0a,T0b,T0c,T0e,T0f,T0g
C determine curves of half of the circle
    do 100 i=0,Npoints
    Theta(i)=i*2.0*Pi/Npoints
c   print*,'i=',i,Theta(i)
100 continue
c   determine the radius as a function of Theta
    Do 200 I=0, Npoints/2
    If (Theta(i).GT.T0b) goto 210
    R(i)=Ro
    goto 200 .
210 If (Theta(i).GT.T0c) goto 220
    R(i)=Ro+Lso*((Theta(i)-T0b)/D0-sin(Pi*(Theta(i)-T0b)/D0)/Pi)
    goto 200
220 If (Theta(i).GT.T0e) goto 230
    R(i)=Ro+Lso*(1+2.*(Theta(i)-T0c)/D0)
    goto 200
230 If (Theta(i).GT.T0f) goto 240
    R(i)=Ro+Lso*(3.+(Theta(i)-T0e)/D0+sin(Pi*(Theta(i)-T0e)/D0)/Pi)
    goto 200
240 R(i)=Ro+LS
200 Continue
    Do 300 i=0,Npoints/2
    R(Npoints-i)=R(i)
300 continue
c to Calculater x,y coordinators
    write(20,*) 'The primary parameters'
    write(20,*) 'Ro=',Ro,' Ls=',Ls
    write(20,*) 'Seal Angle=',D0circle,' Points=',Npoints
    do 400 i=0,Npoints
    x= r(i)*sin(theta(i))
    y= r(i)*cos(theta(i))
    write(20,1000) theta(i)*180/Pi,r(i), R(i)-r(i-1),y
    write(*,1000) theta(i)*180/Pi,r(i), x,y
400 write(30,2000) x,y
c   to calculate the circumference of the profile
    cL3 = 0.0
    cL2 = 0.0
    do 500 i=1,Npoints
    cL2=cL2+r(i)* ( theta(i)-theta(i-1))
    cL3=cL3+r(i-1)*( theta(i)-theta(I-1))
500 continue
    write(*, *) 'circomference=',cL2,cL3,' de=',cL2/Pi
    write(20, *) 'circomference=',cL2,cL3,' de=',cL2/Pi
1000 format(1x,'l',f6.1,' l',f8.4,2(' l',f8.4),' l')
1002 format(1x,f6.4,4(',',f13.4),',',f9.5)
2000 format(1x,'X',f7.4,'Y',f7.4)
    Stop
    end
```

Figure 8:
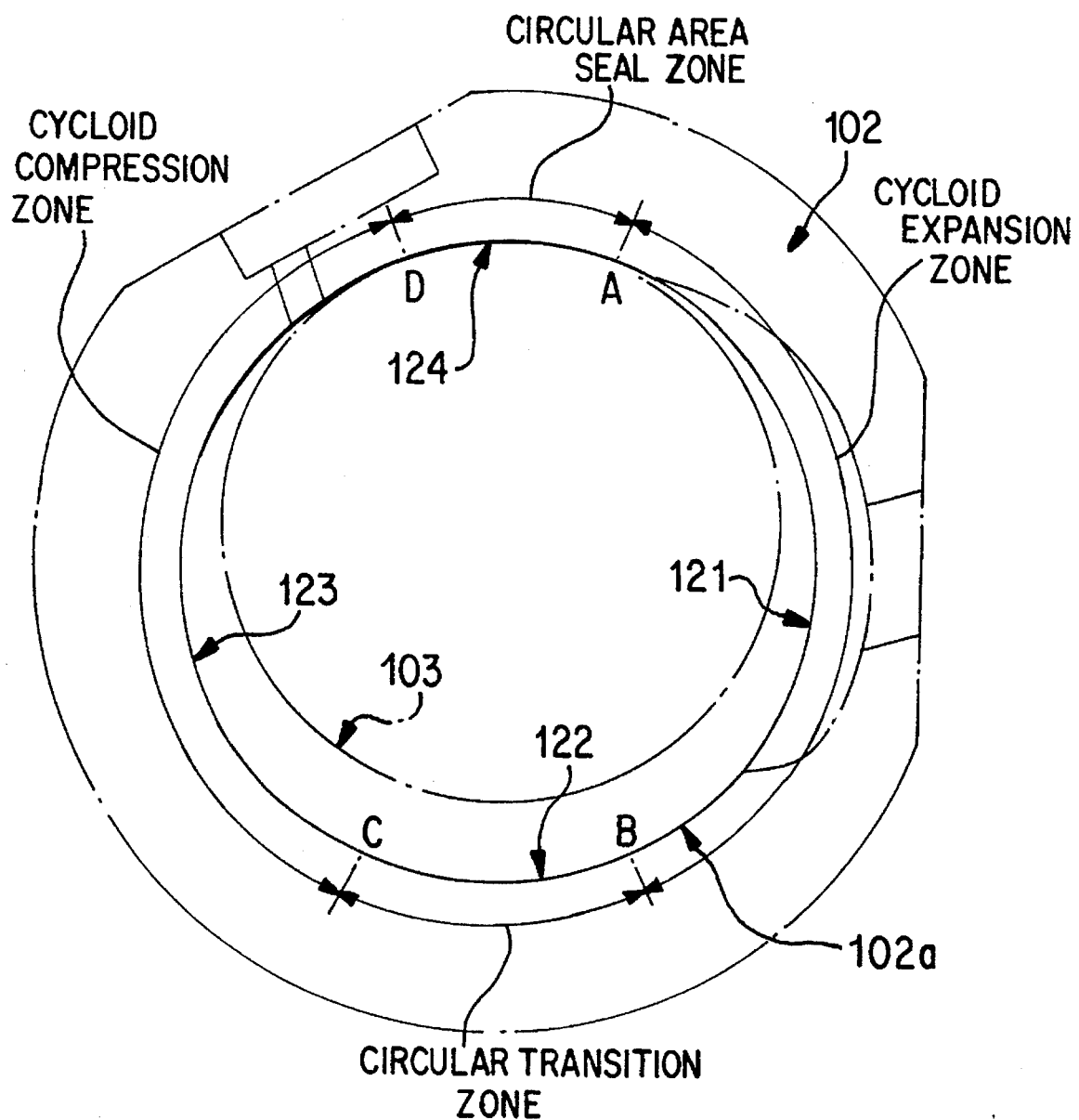
FIG. 8 is a schematic view of the composite bore configuration of the compressor shown in FIGS. 5 and 7.
Figure 11A:
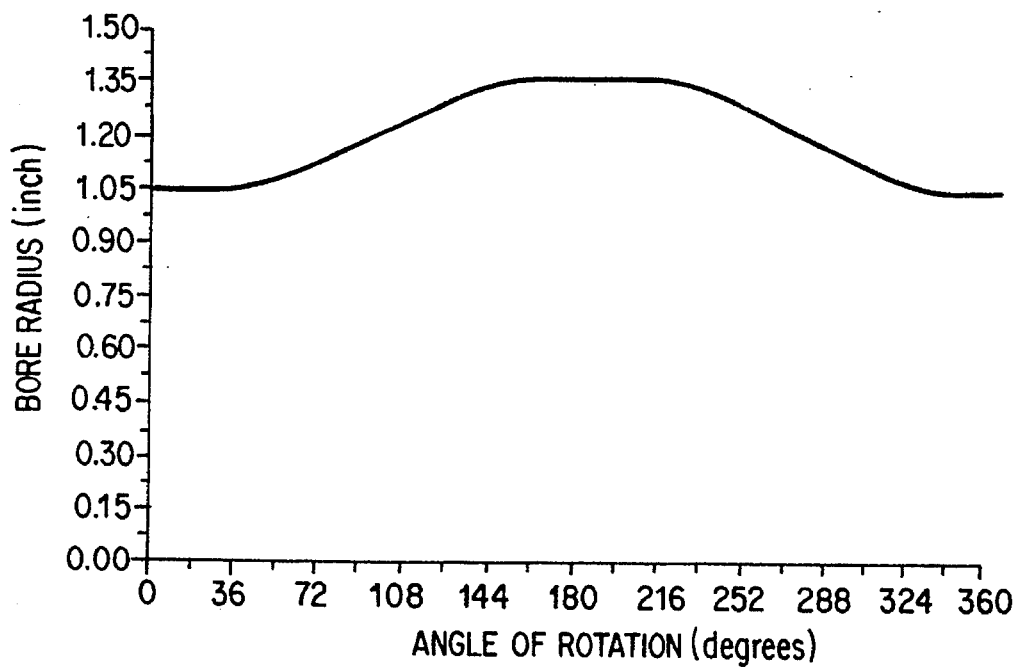
FIGS. 11A–11C are graphs showing variations of vane displacement, velocity and acceleration of the compressor of the present invention in relation to the angle of rotor rotation.

The contour 102a, as formed in accordance with the above Fortran program, can be divided into four regions as shown in FIG. 8 in which the bore contour is symmetrical to the vertical dot-dash line to assure that the sliding vanes move in a substantially harmonic manner. The first cycloidal curve 121 (from A to B) constitutes an expansion segment, the circular curve 122 (from B to C) constitutes a transient segment, the second cycloidal curve 123 (from C to D) constitutes a compression segment, and the small radius circle 124 (from D to A) constitutes a sealing segment or area which we have found to be highly effective in reducing vapor leakage from the high-pressure side (C-D) to the low-pressure side (A-B) when the difference in radii of the rotor 103 and the bore contour 102a in the seal area (D-A) as small as possible (on the order of 0.0005 inch) and thereby providing substantially improved performance in comparison with conventional rotary compressors using a line seal. The cycloidal curves 121, 123 result from analyzing sliding displacement, velocity, acceleration, and jerk of the vanes and by modifying a cycloidal curve. Continuous curves for the vane displacement, velocity, and acceleration are shown in FIGS. 11A–11C and show that a smooth vane movement with less mechanical impact between the vanes 104 and the bore 102 is ensured with the above described compressor configuration.

In the compression process, heat transfer occurs between the compressor 101 and the physical mixture of liquid solution plus refrigerant vapor. Prior to compression, the compressor transfers heat to the fluid, whereas after compression, the direction of heat transfer is the opposite, i.e. from the fluid to compressor. The heat passed to the fluids before compression reduces the volumetric and thermal efficiency of the compressor. In order to obtain high thermodynamic performance, the transfer periods in suction and compression are reduced to the greatest extent possible.

Consequently, on one hand, the vanes 104 are configured to move quickly within the slot in the expansion and compression regions, respectively so that fluids can be drawn into the compressor 101 and isolated from the inlet without being heated and expanded excessively. Likewise the fluids should be compressed quickly and discharged without much passage of time for heat transfer to the compressor and therefore heat transfer to the inlet stream. On the other hand, however, a rapid movement of the vanes 104 may lead to high accelerations with associated dynamic forces. This problem is complicated by the potential for trapped liquid in the vane slots. Therefore, a trade off must be made between speed and acceleration. The cycloid configuration of the compressor of the present invention satisfies the thermal requirements while maintaining moderate accelerations.

Figure 11B:
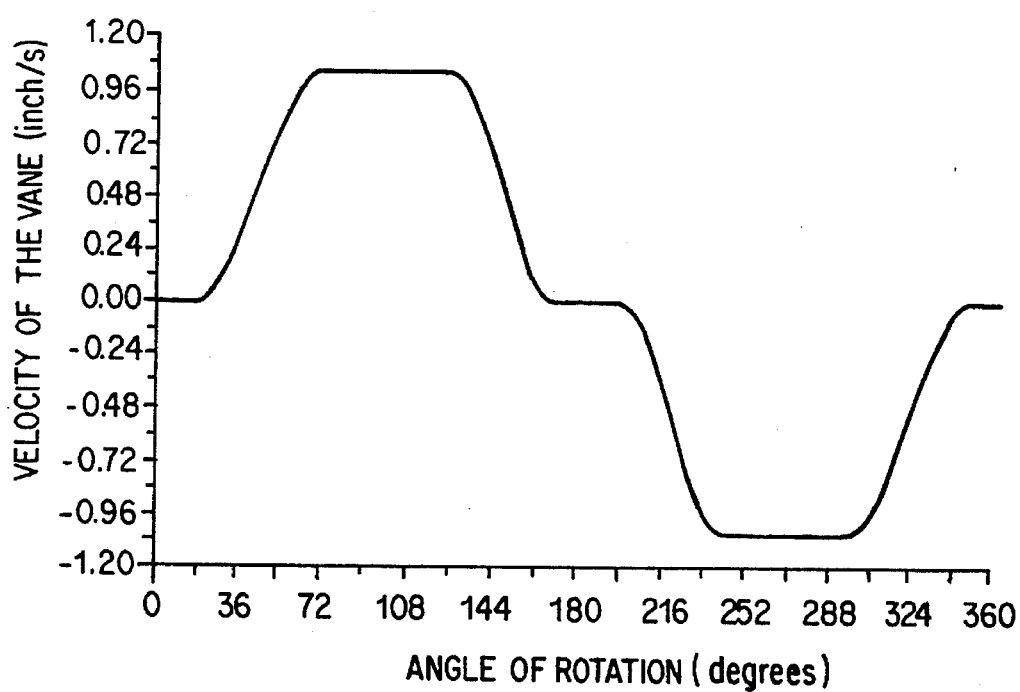
Figure 11C:
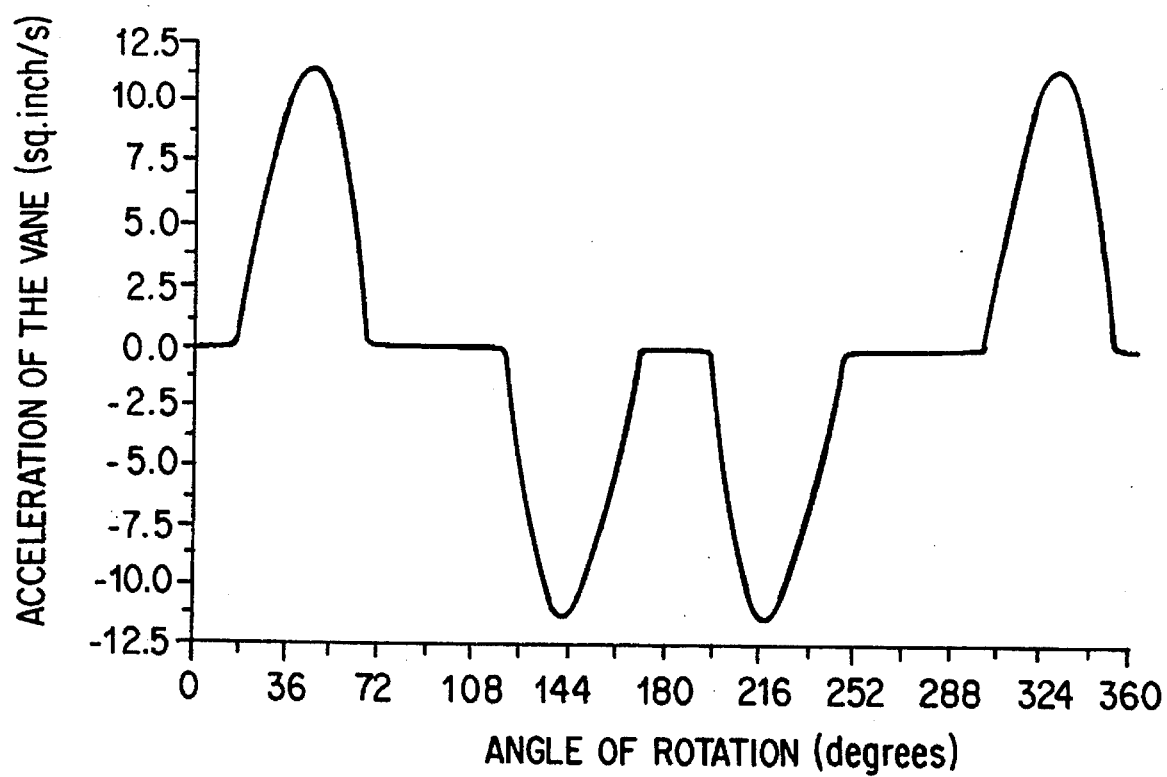

Referring to FIG. 11B, the vane extending velocity is initially zero at the expansion region and quickly reaches its maximum value during the vane extending process within a rotating angle of about 50 degrees. The vane maintains a high speed for about 55 degrees and then reduces its speed to zero. The vane returning process is the opposite of the aforementioned vane extending process. The corresponding displacement curve of FIG. 11A shows an almost linear increase in the expansion region and a linear decrease in compression region, while the associated acceleration curve of FIG. 11C is continuous through vane movement. The composite bore ensures the continuity of the displacement, velocity, and acceleration not only for each individual curve, but also the junction of the different bore profiles.

Because the radial acceleration of the vanes 104 varies gradually throughout the compression zone C-D, vane wearing and compressor vibration are minimized. In addition, the compression rate is slow at the beginning and fast in the compression zone C-D. A first advantage of this geometry is that the fast compression and discharge reduces the time and the area for the hot compressed gas to transfer its heat to the compressor body 102; hence, temperature of the compressor 101 is reduced and thermodynamic efficiency is increased. The second advantage is that residence time in the compressor 101 is reduced, thereby reducing the internal leakage and increasing the volumetric efficiency.

As shown in FIGS. 5A and 5B of U.S. Pat. No. 5,310,326, which is incorporated by reference herein, exhaust holes in the compressor bore are arranged to avoid exhaust choking and to minimize dead volume.

Figure 6A:
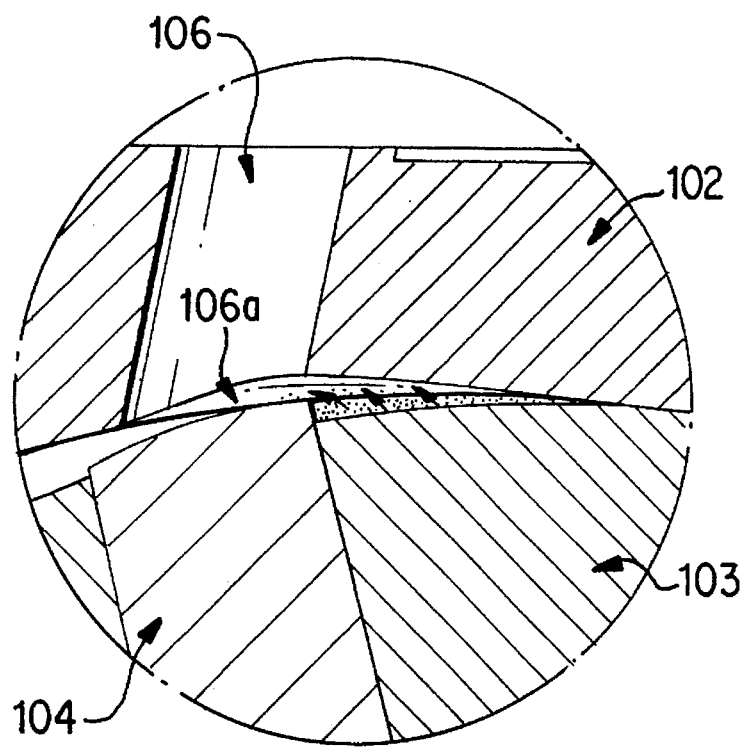
FIGS. 6(a) and 6(b) are, respectively, an enlarged sectional view of the liquid release grooves, as shown in isolated section 6 of FIG. 5 and a bottom view of the liquid release grooves from inside the bore.
Figure 6B:
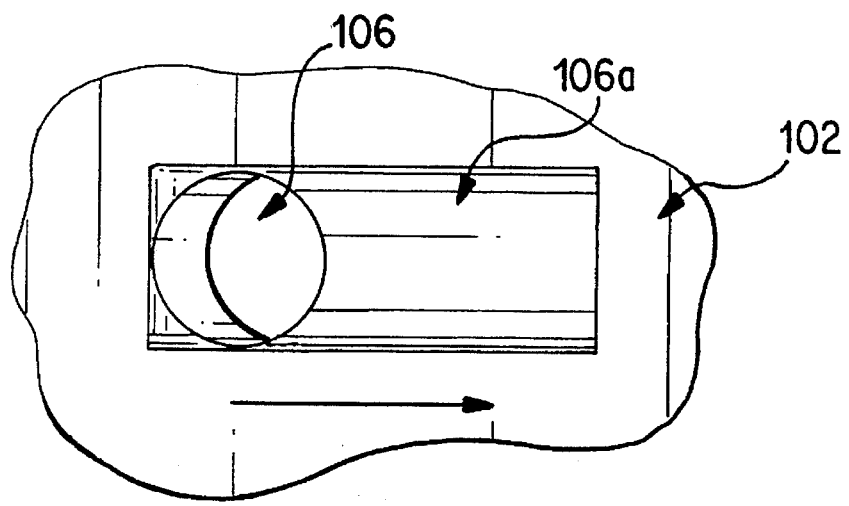

FIG. 6 is an exploded sectional view of the liquid release grooves 106a and discharge port 106. Liquid release grooves 106a are located at the entrance of the contact seal zone 124 (FIG. 8) and lead to the exhaust or discharge port 106. Any liquid in this area will, therefore, be discharged to the exhaust port without causing knocking, particularly when there is a high percentage of liquid in the mixture.

The symmetrical arrangement of the bore contour and the rotor about the vertical lines in FIG. 8 herein makes the vanes 104 (FIG. 5) opposite each other synchronous and harmonizes their movement. Two vane slot pressure-equalizing passages 108a and 108b (FIG. 9) on the rotor 103, at the bottom of the two opposite vane slots, are arranged to reduce the pressure in the vane slots 107 and the vanes 104 to allow liquid trapped in the base of the vane slots an easy exit. Otherwise, trapped liquid would keep the vanes 104 from entering into the rotor housing, and would result in damage to the vanes. In use in the heat pump system, the liquid mixture in the compressor, which has relatively high viscosity, also helps to seal the seal zone 124 between the bore 102 and the rotor 103, the gap between the rotor 103 and the end caps (shown in FIG.. 2 of U.S. Pat. No. 5,310,326), and the gap between the vanes 104 and the bore 102 and the end caps.

Figure 7:
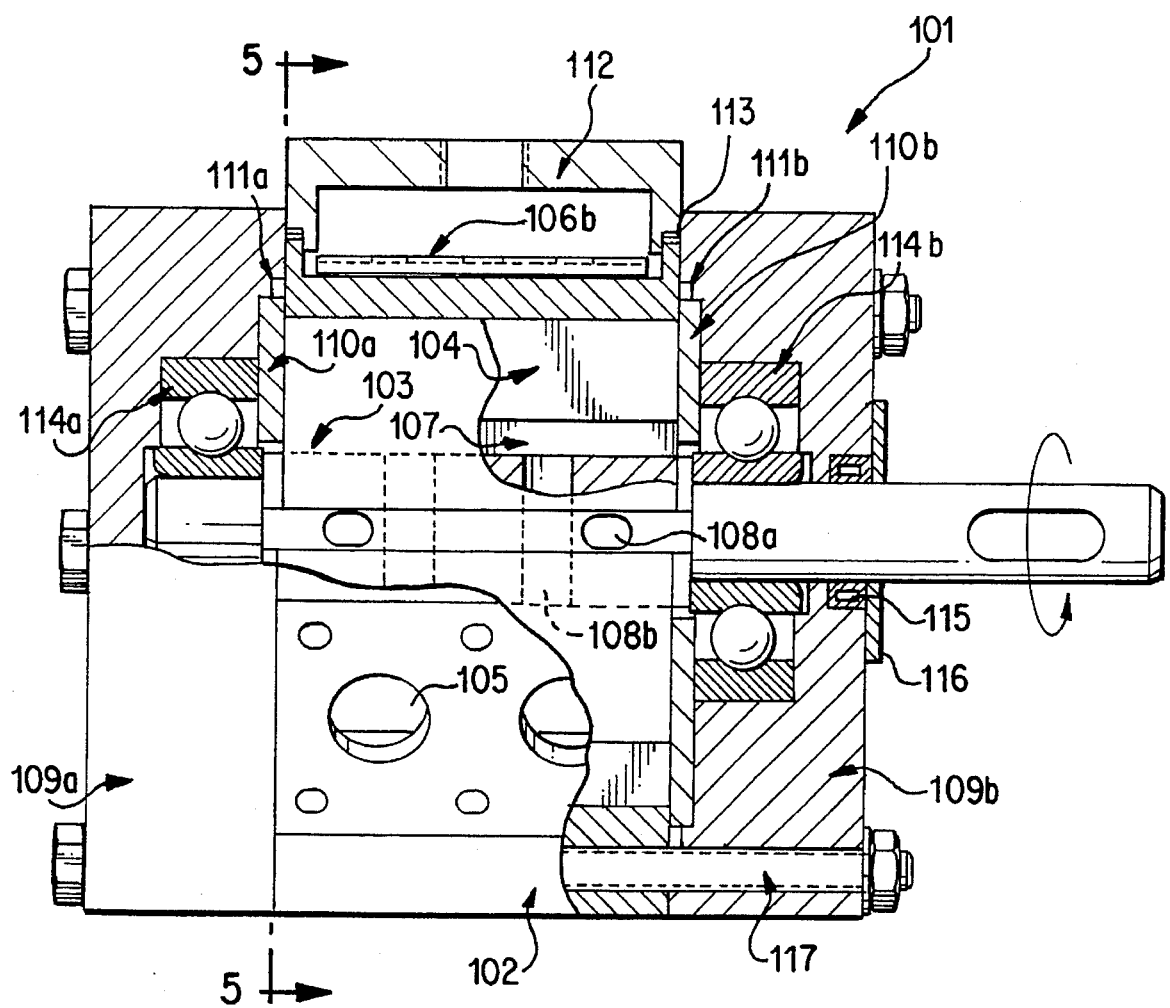
FIG. 7 is a side view, partially in cross-section, of the two-phase compressor used in the systems of FIGS. 3 and 3A.

Whereas FIG. 5 is a front view of the compressor with the end caps and end disk removed, FIG. 7 is a side view thereof which includes the end caps and end disks. The end caps 109a, 109b hold the rotor in place. The end disks 110a, 110b seal the rotor to prevent leakage between chambers. The end cap seals 111a, 111b prevent leakage from the chambers to the ambient. The discharge cover 112 provides a way of directing the discharge fluid into the discharge plumbing. The discharge cover seal 113 seals the discharge cover to prevent leakage to the ambient. The bearings 114a, 114b support the rotor. The shaft seal 115 prevents leakage through the shaft clearance to the ambient. The shaft seal cover 116 holds the shaft seal in place and the fastening screws 117 secure both end caps to the bore housing.

Figure 9B:
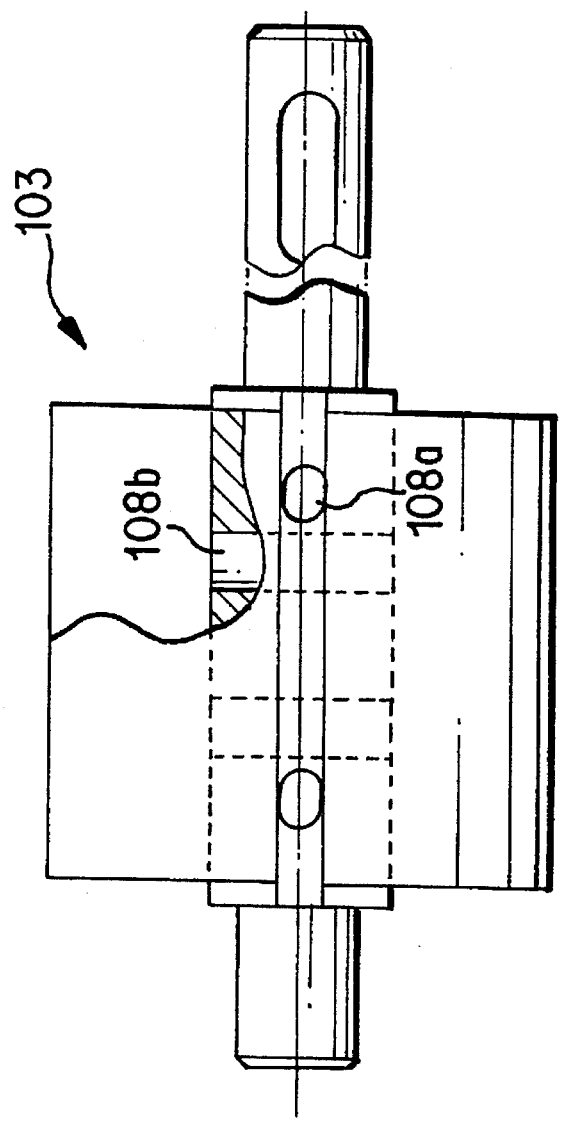
FIGS. 9(a) and 9(b) are, respectively, front and side views of the rotor configuration of the compressor shown in FIGS. 5 and 7, showing the vane slots and pressure-equalizing passages connecting opposing vane slots.
Figure 9A:
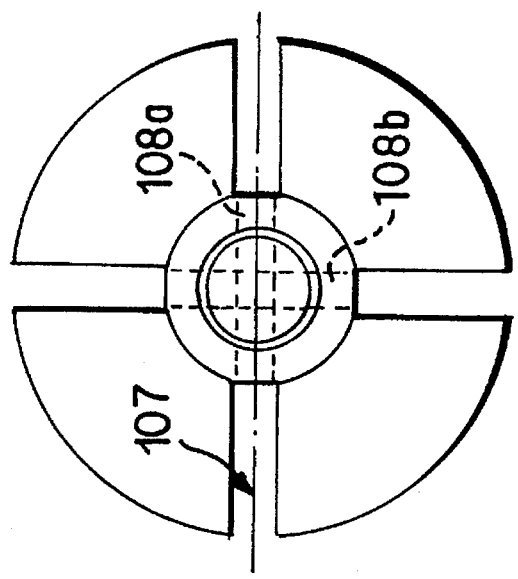

FIGS. 9(a) and 9(b) show the vane slots 107 and pressure-equalizing passages 108a, 108b connecting opposing vane slots.

Figure 10B:
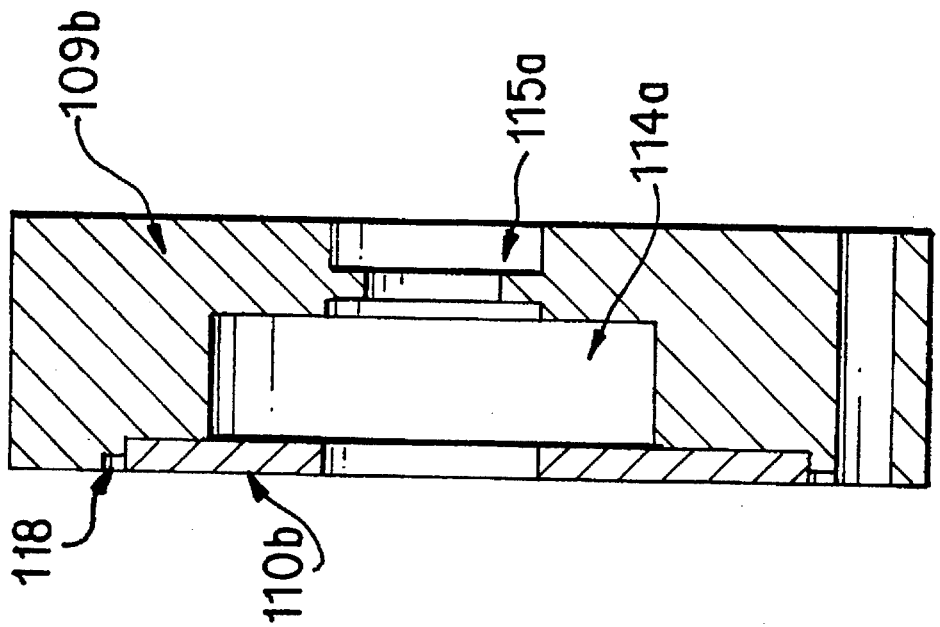
FIGS. 10(a) and 10(b) are, respectively, front and side views of the end cap and end disk of the compressor shown in FIG. 7.
Figure 10A:
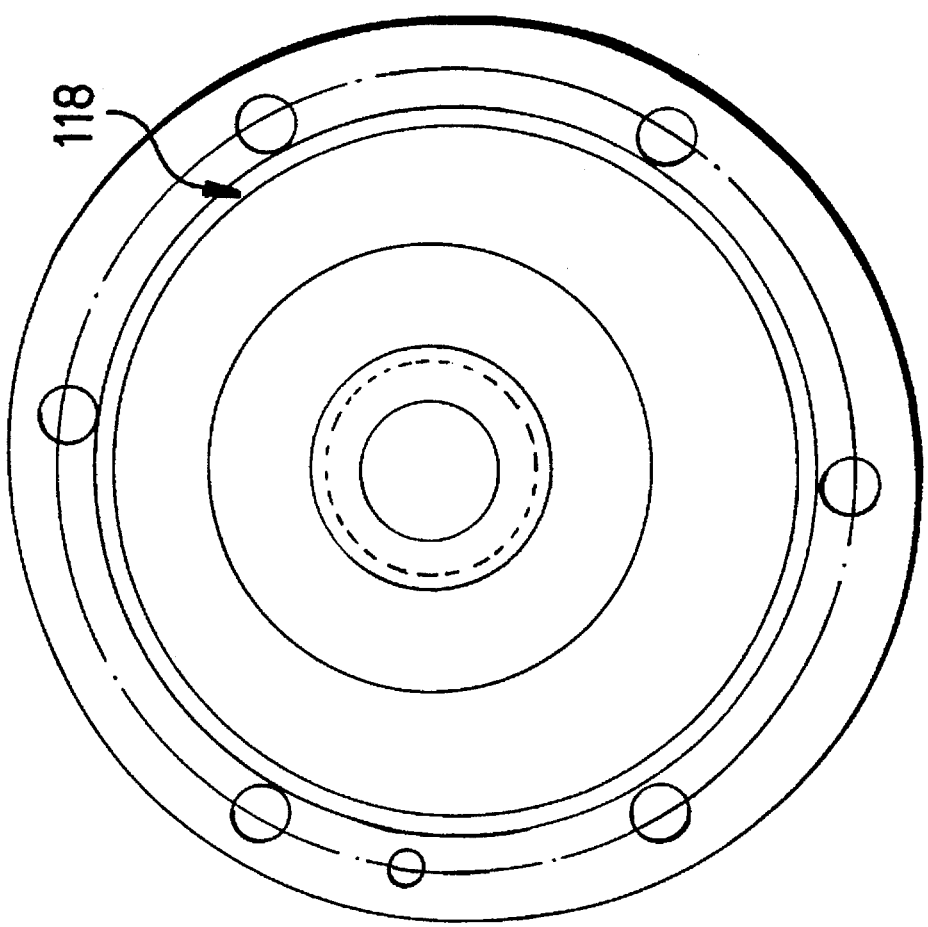

In FIGS. 10(a) and 10(b), the end cap O-ring seal groove 118 is formed by the annular void between the larger end cap countersink and the smaller end disk.

The number of the vanes is related to the friction heat generation (i.e., the friction between the vanes, bore and rotor), seal capability, and initial compression volume. For a small size compressor, the unit friction heat (the friction heat generated per unit of gas) is high. Too much friction heat will result in a reduction of the intake mass flow rate because of the thermal expansion of the gas and an increase of the required unit compression work. Thus, frictional heating is one of the main concerns in configuring the rotor 103 and choosing the number of vanes. For the two-phase compressor of the present invention, four vanes have been found to achieve the objectives for a two-phase rotary compressor.

As described in U.S. Pat. No. 5,310,326, vanes can be made, for example, of a self-lubricating material polyamide, called Vespel 211 consisting of 15% graphite and 15% P.T.F.E. This material is light and has small friction coefficient with metals. Vespel 211 has demonstrated its compatibility with refrigerants and lubricants, although, of course, other percentages of graphite and P.T.F.E. are available. To enforce the strength of the root of the slot on the rotor 103, the shaft and the rotor are made of one piece which is hardened so that a good surface finishing and wearing resistance can be gained.

The outlet is a path for discharging the compressed gas and for stopping the back flow, and is composed of four radial holes on the bore with a valve blade on the outside as seen in FIG. 7 of U.S. Pat. No. 5,310,326. In configuring the valve, at least two conflicting criteria are important. First, the discharge must be smooth and low resistance. Second, the dead volume, which is the discharging passage volume itself, must be reduced. We have found that the discharging port (106) inside the bore 102 should be arranged as short as possible (its length is less than twice its diameter) and close to the seal zone (D-A), where the width between the rotor 104 and the bore 102 is just enough for compressed gas to pass through without choking, so that the dead volume can be reduced to a minimum. The discharge passage in our compressor is also tangent to the rotor cylinder in order to have streamlined flow. The valve blade is very thin, only about 0.005 inch thick, to provide a minimal differential opening pressure, and rapid dynamic response. Spring steel which possesses good elasticity has been found to be an acceptable blade material. The region where significant compression occurs includes the exhaust valve so that incompressible liquid can be pushed out the exhaust valve as the vapor is compressed.

An external shaft seals of the type shown in U.S. Pat. No. 5,310,326 are commercial two-lip seals made of Graphite PTFE which has good wearing resistance. Even some wear will not degrade the utility of the seal. A spring along with the pressure on the slip itself, presses the seal against the shaft to assure the reliability and long life of the seal. The compressor assembly is fastened by bolts which seal the contact faces with stationary O-ring seals.

The compressor bore can be made on the CNC 3-axis milling machine which has the accuracy of 0.0001 inch. The above-described Fortran program was used to calculate the coordinates of the bore curvature in terms of the optimized profile, and the data was then transferred to _the CNC milling machine.

Only one position pin was used between the bore and the end-cap on each side. A minimum clearance between the bore and the rotor, i.e., the seal zone, was assured when assembled.

The liquid solution itself provides sealing in the compressor of the present invention. That is, the liquid oil for sealing is replaced by the liquid solution as the sealing liquid. However, this liquid is not injected into the compressor, but enters through the inlet in the same manner as the vapor.

The inlet of the liquid and vapor mixture requires a more streamlined and larger inlet compared to a vapor-only compressor, so the inlet 105 is arranged at the face of the bore housing 102 rather than being located on the end cap, and the area of the inlet 105 is also much larger than inlets of conventional vapor-only compressors. Likewise, the curvature of the two-phase compressor bore 102a is significantly different from the curvature of the single-phase vapor compressor including the compressor described in U.S. Pat. No. 5,310,326.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A heat pump system, comprising a two-component, absorbent/refrigerant mixture, a generator, an absorber, a throttling valve operatively arranged between the absorber and the generator, and a compressor operatively arranged between the generator and the absorber and configured to compress, without requiring separation, all of two phases of the mixture consisting of refrigerant component in vapor phase and absorbent component in the liquid phase produced in the generator.

2. The heat pump system according to claim 1, wherein the absorber is a high temperature heat exchanger configured to cool the compressed working mixture received from the compressor so as to recombine the refrigerant component in vapor phase with the absorbent component.

3. The heat pump system according to claim 1, wherein the absorbent component of the mixture is one of a liquid capable of absorbing refrigerant vapor to form a liquid solution, a solid absorbent suspended in a liquid carrier, a solid adsorbent suspended in a liquid carrier, and a liquid compound capable of reversible chemical reaction with refrigerant vapor.

4. The heat pump system according to claim 1, wherein the refrigerant component has a concentration sized to maximize cooling performance.

5. The heat pump system according to claim 1, wherein the absorbent component of the mixture is a substantially liquid solution.

6. The heat pump system according to claim 5, wherein the refrigerant component of the mixture is a compound in the vapor phase.

7. The heat pump system according to claim 6, wherein the absorbent and refrigerant components of the mixture are selected such that the mixture entering the generator after passing through the throttle valve has heat transferred into the mixture and a portion of the refrigerant is driven out of the mixture so as to form a superheated refrigerant vapor and liquid solution mixture and after passing through the two-phase compressor the superheated refrigerant vapor and liquid solution will substantially recombine after leaving the compressor.

8. The heat pump system according to claim 7, wherein the absorbent component is present in the mixture in a concentration of about 14%.

9. The heat pump system according to claim 1, wherein the fluid is selected from a group of refrigerant-absorbent mixtures consisting of a water-salt pair, an ammonia-salt pair, an ammonia-organic solvent pair, an alcohol-salt pair, an ammonia-water pair, an amine-organic solvent pair, an amine-salt pair, and a halogenated hydrocarbon-organic solvent pair.

10. The heat pump system according to claim 1, wherein the absorber and the generator are shell- and tube-type heat exchangers.

11. The heat pump system according to claim 1, wherein the absorbent component of the mixture is selected from the group consisting of a liquid capable of absorbing refrigerant vapor to form a liquid solution, a solid particle absorbent suspended in a liquid carrier to absorb refrigerant vapor, a solid particle adsorbent suspended in a liquid carrier to adsorb refrigerant vapor, and a liquid compound capable of reversible chemical reaction with refrigerant vapor to form another liquid-phase compound.

12. The heat pump system according to claim 11, wherein the absorbent component constituting one of the solid particle absorbent and the solid particle adsorbent amounts to about 20% of the liquid carrier by volume.

13. The heat pump system according to claim 1, wherein the refrigerant is selected from the group consisting of water, ammonia, methanol, methylamine, halogenated hydrocarbons, sulfur dioxide and hydrogen, and the absorbent is selected from the group consisting of the following:

aqueous lithium bromide solution aqueous sodium hydroxide solution aqueous magnesium chloride solution aqueous sulfuric acid solution aqueous potassium hydroxide solution aqueous calcium chloride solution lithium nitrate/ammonia solution ammonium chloride/ammonia solution sodium thiocyanate/ammonia solution ammonium bromide/ammonia solution ammonium thiocyanate/ammonia solution
ammonium iodide/ammonia solution
lithium thiocyanate solution
lithium bromide/methanol solution
zinc bromide/methanol solution
calcium bromide/methanol solution
lithium thiocyanate/methylamine soln.
tetraethylene glycol dimethylether
N,N-dimethylformamide
N,N-dimethylacetamide
dibutyl sebacate
dibutyl phthalate
diethylene glycol
aniline
xylene
dimethylether diethylene glycol
metal hydrides in a liquid carrier
cyclohexane <->benzene+hydrogen.

14. The heat pump system according to claim 1, wherein the compressor has a bore configuration made by a process in which a machine is controlled by and operated in terms of data obtained by a Fortran program as follows:

```
C    This program is to determine the profile of a bore based on cycloid curves
C    which will have continuous acceleration curves.
C        This program was revised from previous program based on modofied ellips.
C                    1992-11-4
C
C     T0: theta
C   1 T0A-T0B: circle about 20 degree, or Pi/8
C   2 T0B-T0C: cycloidal curve, +a, about 66.67 degree, or Pi/4
C   3 T0C-T0E: straight line, a = 0, about 66.67 degree, or Pi/4
C   4 T0E-T0F: cycloidal curve, -a, about 66.67 degree, or Pi/4
C   5 T0F-T0G: circle about 20 degree, or Pi/8
C
C     T0A-T0G: Pi, 180 degree
C     T0G-T0A: this part curve is symmetric to the y axis.
C
C     1. to calculate the coordinates of the compressor bore
C     This bore profile consists of eight pieces, two pieces of circle arcs,
C     four pieces of cycloidal arcs, and two piece linear increasing arc
C     between two cycloidal arcs.
C
C     2. to calculate the velocity and accelation of the vane.
C
C     R0 - rotor radius
C     Ls - stretch length of vanes
C     Lso - ¼ stretch length of vanes
C     T0A - the angle at which center of seal arc is located
C     T0B - the angle at which the first cycloidal arc begins
C     T0C, T0E, T0F: conjunction points of different curves and arcs.
C     r - radius variable (inch)
C     x,y - point coordinates
C
C     program compbore1992-11
      program compbore
      common Theta(2100), r(2100)
C        doubleprecision Theta,r
      parameter(Pi=3.141593, T0a=0., T0g=3.141593)
      real Ls,lso
      open(10,file='input.bor',status='old')
      open(20,file='bore.dat',status='unknown')
      open(30,file='Cycldbor.mill',status=unknown')
c    initial data setup
         write(*,*)'Read the the data from data file: INPUT.BOR'
         read(10,*) Ro, Ls, Npoints, D0circle
      D0=(180.-2*D0circle)/3.0 *Pi/180.
      D0straight=D0
      D0cycloid=D0
      Lso=Ls/4.0
      T0b=T0a+D0circle *Pi/180.
      T0c=T0b+D0cycloid
      T0e=T0c+D0straight
      T0f=T0e+D0cycloid
      Write(*,*)'T0a,b,c,e,f,g=',T0a,T0b,T0c,T0e,T0f,T0g
C    determine curves of half of the circle
         do 100 i=0,Npoints
            Theta(i)=i*2.0*Pi/Npoints
c                print*,'i=',i,Theta(i)
100      continue
c    determine the radius as a function of Theta
         Do 200 I=0, Npoints/2
         If (Theta(i).GT.T0b) goto 210
            R(i)=Ro
            goto 200
210      If (Theta(i).GT.T0c) goto 220
```

-continued

```
        R(i)=Ro+Lso*((Theta(i)-T0b)/D0-sin(Pi*(Theta(i)-T0b)/D0)/Pi)
        goto 200
220  If (Theta(i)-GT.T0e) goto 230
        R(i)=Ro+Lso*(1+2.*(Theta(i)-T0c)/D0)
        goto 200
230  If (Theta(i).GT.T0f) goto 240
        R(i)=Ro+Lso*(3.+(Theta(i)-T0c)/D0+sin(Pi*(Theta(i)-T0e)/D0)/Pi)
        goto 200
240  R(i)=Ro+Ls
200  Continue
     Do 300 i=0,Npoints/2
     R(Npoints-i)=R(i)
300  continue
c to Calculater x,y coordinators
     write(20,*) 'The primary parameters'
     write(20,*) 'Ro=',Ro,'  Ls=',Ls
     write(20,*) 'Seal Angle=',D0circle' Points=',Npoints
     do 400 i=0,Npoints
     x=r(i)*sin(theta(i))
     y=r(i)*cos(theta(i))
     write(20,1000) theta(i)*180/Pi,r(i),R(i)-r(i-1),y
     write(*,1000) theta(i)*180/Pi,r(i),x,y
400  write(30,2000)x,y
c    to calculate the circumference of the profile
     cL3=0.0
     cL2=0.0
     do 500 i=1,Npoints
     cL2=cL2+r(i)* (theta(i)-theta (i-1))
     cL3=cL3+r(i-1)*(theta(i)-theta(I-1))
500  continue
     write(*, *)'circomference=',cL2,cL3,' de=', cL2/Pi
     write(20, *)'circomference=',cL2,cL3,' de=', cL2/Pi
1000 format(1x,'I',f6.1,'  I',f8.4,2('  I',f8.4),' I')
1002 format(1x,f6.4,4(',',f13.4),',',f9.5)
2000 format(1x,'X',f7.4,'Y',f7.4)
     Stop
     end
```

15. A heat pump method comprising the steps of
(a) rejecting heat from a substantially liquid solution with one of absorbed, adsorbed and chemical-reacted refrigerant therein to a surrounding volume,
(b) throttling the solution to decrease pressure thereof,
(c) transferring heat into the solution to vaporize some of the refrigerant therefrom, and
(d) compressing, without requiring separation, the solution and refrigerant vapor together and
(e) thereafter repeating step (a).

16. The heat pump system according to claim 1, wherein the compressor has a composite bore configuration composed of cycloidal curves constituting expansion and compression segments and circular curves constituting transient and sealing segments with appropriate transitions therebetween whereby a circumferential inlet streamlines inlet flow and the cycloidal curves provide compressor vanes with a smooth movement for the two-phase/two-component mixture.

* * * * *